May 8, 1962    J. A. MacDONALD BRISBANE    3,034,054
PHASE INDICATOR OF PHASE LOCKED OSCILLATORS
UTILIZING CATHODE RAY TUBE
Filed Dec. 16, 1959
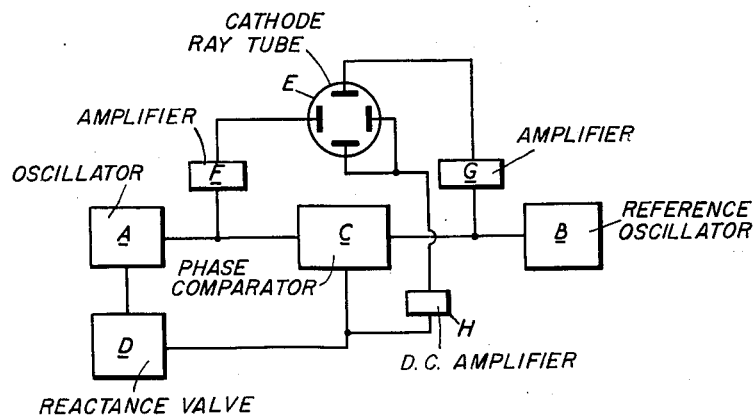
INVENTOR
John Alexander MacDonald Brisbane
BY Baldwin & Wight
ATTORNEYS United States Patent Office 3,034,054
Patented May 8, 1962

3,034,054
PHASE INDICATOR OF PHASE LOCKED OSCILLATORS UTILIZING CATHODE RAY TUBE
John Alexander MacDonald Brisbane, Chelmsford, England, assignor to Marconi's Wireless Telegraph Company Limited, London, England, a company of Great Britain
Filed Dec. 16, 1959, Ser. No. 859,944
Claims priority, application Great Britain Apr. 10, 1959
3 Claims. (Cl. 324—88)

This invention relates to radio frequency oscillator arrangements and more particularly to such arrangements of the kind in which oscillations from two sources are compared in phase to develop a control voltage dependent upon the departure of the relative phase from a predetermined relationship and the control voltage is employed to adjust at least one of the sources in a direction to obtain said predetermined relationship. Normally the predetermined relationship is the in-phase relationship but this is not essential.

In the usual arrangements of this kind the control voltage adjusts the frequency of one of the sources (generally an oscillator) by means such as a reactance valve or in any other well known way. In practice, however, if one of the sources of oscillation drifts in frequency relative to the other e.g. due to temperature changes, a control voltage will be required to bring it to the same frequency as the other and maintain it there and, since in any "error voltage" type of automatic control system a control voltage is not produced until there is error, the two oscillations, though controlled to be at the same frequency, will not have the required phase relation (assumed to be in phase). The present invention seeks to overcome this defect and to provide improved means for indicating whether or not a required phase relation is obtained in order that, if further adjustment (e.g. manual) is required to obtain it, that adjustment may be made.

The phase relation between oscillations from two sources can obviously be measured by a phase meter or indicated by a cathode ray tube oscillograph having mutually perpendicular deflection means one of which is fed from one source and the other of which is fed from the other. These well known expedients are, however, insufficient for the purpose here in question because the measurement or indications given for small departures from the required phase relation are themselves small and it is the small departures which are required to be clearly shown. In other words the discrimination of the ordinary known phase relation measuring or indicating means is insufficient.

According to this invention there is provided in combination two sources of oscillations, means dependent upon departures from a predetermined phase relation between said sources for producing a control signal which is applied to control the frequency of at least one of said sources in a direction to reduce said control signal to zero, an oscillograph, means for applying oscillations derived from said two sources to apply deflection to said oscillograph in one or other of two co-ordinate directions to produce a characteristic pattern of display by said oscillograph and means for applying a signal derived from said control signal to shift said pattern in position.

According to a feature of this invention a radio frequency oscillator arrangement of the kind referred to is provided with a phase-lock indicator comprising a cathode ray tube, oscillograph means, responsive to oscillations in dependence on whose phase relationship a control signal is to be produced, for indicating the frequency relation therebetween on said cathode ray tube and means for deflecting the beam of the cathode ray tube oscillograph in accordance with the control signal.

Preferably the arrangement is such that the oscillograph is deflected in one direction when the control signal is of one sense (e.g. positive) and in the opposite direction when it is of the opposite sense (negative).

Preferably also the arrangement is such that the oscillograph is deflected on one direction in accordance with the frequency of oscillations derived from one source and in a direction perpendicular thereto in accordance with the frequency of oscillations derived from the other source.

The accompanying drawing shows in simplified block diagram form a radio frequency oscillator control arrangement incorporating the present invention.

Referring to the drawing A is a radio frequency oscillator whose frequency is to be maintained at the frequency of a stabilised source of reference oscillations B. Oscillations from the oscillator A and the source B are fed to a known phase comparator C which is adapted to produce a D.C. control voltage whose magnitude and sign is dependent on the magnitude of and the sense of the phase difference between the oscillations from A and B. This control voltage is then fed to a reactance valve D which controls the frequency of the oscillator A in well known manner (the reactance of the reactance valve is normally included in a frequency determining circuit of the oscillator A) so as to tend to produce and maintain zero control voltage output from the phase comparator C. As so far described the arrangement is well known.

In accordance with the present invention the two inputs of the phase comparator C are separately connected, via amplifiers F and G, respectively, to different ones of two mutually perpendicular deflection plates of a cathode ray tube E, another two mutually perpendicular deflection plates of which are arranged to be fed, via a D.C. amplifier H with the control voltage from the phase comparator C. When the frequencies of the two input signals to the phase comparator C are the same i.e. when the frequency of oscillator A is locked to that of source V the trace on the cathode ray tube will show an ellipse (or a line or circle in the limiting cases). The arrangement is such that the ellipse is small in comparison with the face of the tube and that the ellipse is central on the tube face when the control voltage from the phase comparator C is zero. When the control voltage is positive the ellipse is deflected in one direction and when negative, in the other direction.

It will be seen that should any variation occur within the oscillator A the ellipse will be deflected across the tube face and will be readily observed, and adjustment of the oscillator may be made to return the ellipse to its central position whereby the in-phase relation is readily and accurately obtained.

Clearly, if desired, only one deflection plate of the cathode ray tube need be fed with the control voltage. The deflection arrangements may of course in all cases comprise deflection coils rather than deflection plates or any convenient combination of the two may be used. Other changes in the associated circuits consequent upon the use of deflection means other than deflection plates will be obvious to persons skilled in the art and require no description here.

Although the invention has been described in relation to a simple frequency control system it may, of course, be used with other systems of a more complex nature.

I claim:
1. In combination two sources of oscillations, phase comparison means connected to receive oscillations from said two sources and dependent upon departure from a predetermined phase relation between said sources for producing a D.C. control signal, means fed with said control signal and connected to one of said sources for varying the frequency of said one source in a direction to re- duce said departure to zero, a cathode ray oscillograph having first and second deflection means for deflecting the beam thereof in perpendicular directions, means for applying oscillations derived from said two sources to said first and said second deflection means respectively, to deflect the beam of said oscillograph in one of two co-ordinate directions to produce a characteristic pattern of display by said oscillograph and means for applying said control signal to said deflection means to shift said pattern in position.

2. Apparatus as claimed in claim 1 wherein the oscillograph is deflected in one direction when the control signal is of one sense and in the opposite direction when it is of the opposite sense.

3. Apparatus as claimed in claim 1 wherein the oscillograph is deflected in one direction in accordance with the frequency of oscillations derived from one source and in a direction perpendicular thereto in accordance with the frequency of oscillations derived from the other source.

References Cited in the file of this patent

UNITED STATES PATENTS 2,814,775     Kummer _____ Nov. 26, 1957